United States Patent [19]
Bolte et al.

[11] Patent Number: 5,682,089
[45] Date of Patent: Oct. 28, 1997

[54] CONTROL CIRCUIT FOR GENERATING A SPEED DEPENDENT DECELERATION FORCE IN AN ELECTRONICALLY COMMUTATED MOTOR

[75] Inventors: Ekkehard Bolte, Aachen; Jürgen Halfmann, Herzogenrath, both of Germany

[73] Assignee: U.S. Philips Corporation, New York, N.Y.

[21] Appl. No.: 559,784

[22] Filed: Nov. 15, 1995

[30] Foreign Application Priority Data

Nov. 26, 1994 [DE] Germany .............................. 44 42 151.6

[51] Int. Cl.$^6$ .................................................. H02P 3/00
[52] U.S. Cl. .................................................. 318/439; 49/28
[58] Field of Search .............................. 318/280–286, 318/466–472, 267, 269, 360–372; 49/26, 28; 160/292, 293.1

[56] References Cited

U.S. PATENT DOCUMENTS

| 3,866,100 | 2/1975 | Palenchar et al. | 318/467 X |
|---|---|---|---|
| 4,090,113 | 5/1978 | Ogishi | 318/282 |
| 4,145,641 | 3/1979 | Ozaki | 318/269 |
| 4,271,385 | 6/1981 | Azusawa | 318/722 |
| 4,563,625 | 1/1986 | Kornbrekke et al. | 318/283 X |
| 4,614,902 | 9/1986 | Jessup | 318/282 |
| 4,713,591 | 12/1987 | McCloskey | 318/282 X |
| 5,220,257 | 6/1993 | Yoshino et al. | 318/254 |

Primary Examiner—Jonathan Wysocki
Attorney, Agent, or Firm—Edward Blocker

[57] ABSTRACT

A control circuit for controlling the speed and stopping time of an electronically commutated motor having a rotary drive member and a stator having at least one phase coil, electric power being supplied to the phase coils by current supply elements which are controlled by the control circuit to obtain a given phase voltage and a given load angle during operation. In response to a supplied stop signal the control circuit decelerates the drive member by controlling the phase voltage and load angle so as to produce a deceleration force which changes dependent on the speed of the drive member; there being a high speed range over which the deceleration force increases to a maximum value as speed is reduced; an intermediate speed range over which the deceleration force remains substantially constant at the maximum value as speed is further reduced, and a low speed range over which the deceleration force reduces as speed is still further reduced to a stop. The intermediate range adjoins the low range at a speed at which the deceleration force which would result from direct short-circuiting of the phase coils would substantially reach a maximum value. A significantly reduced stopping time can be obtained.

10 Claims, 3 Drawing Sheets

CONTROL CIRCUIT FOR GENERATING A SPEED DEPENDENT DECELERATION FORCE IN AN ELECTRONICALLY COMMUTATED MOTOR

BACKGROUND OF THE INVENTION

1. Field of the Invention

The invention relates to a circuit arrangement for controlling an electronically commutated motor having a movable drive member and at least one phase coil, and which is energisable from a direct voltage source with a given phase voltage and a given load angle. Such circuit arrangement comprises means (hereinafter referred to as: motion sensor) for determining the position and/or speed of movement of the movable drive member, current supply elements for the controlled connection of the phase coils to the direct voltage source, and a control circuit for controlling the current supply elements so as to obtain the given phase voltage(s) and load angles. The current supply elements are controllable by the control circuit to decelerate the drive member by selecting it to a force opposite to its direction of movement.

2. Description of the Related Art

U.S. Pat. No. 4,271,385 describes a control system for a commutatorless motor, in which system a synchronous motor having a polyphase armature winding and a field winding is driven by a frequency convertor. To this end, a position signal related to the rotational position of the synchronous motor is adapted to be shifted in phase by a position control signal by a maximum of 180° to the lead and the lag side so as to generate a firing pulse for the frequency convertor by a combination of a phase-shifted position signal and a reverse signal. Thus, the modes of operation are switched in a stable manner between motoring operation and regenerative operation and between forward and reverse operation by changing the magnitude of the phase control signal and by reversing the polarity thereof.

U.S. Pat. No. 5,220,257 describes a motor control circuit in which the motor is driven by a driving current in accordance with a torque control signal, and in which the motor rotation is stopped by generating a torque in the reversing direction when a stop signal for stopping the motor is received. This motor control circuit further comprises a level inverting circuit disposed between a torque control generating circuit and a drive circuit to invert the level of the torque control signal with respect to a predetermined reference level. A level-inverted torque control signal is supplied to the drive circuit when the stop signal is received. The motor control circuit further comprises a reference signal generating circuit which generates a reference signal corresponding to a reference rotational speed of the motor and which also generates a further reference signal corresponding to a rotational speed lower than the reference rotational speed when the stop signal is received.

Recently, electronically commutated motors are employed for a variety of uses in small electrically operated apparatuses. For many of these uses, particularly in the domestic field, motorcars, automation, machine tools and the like, it is important that such an apparatus stops as rapidly as possible when it is taken out of operation, which is desired or required for reasons of safety, saving time or accuracy in working therewith.

For stopping within a very short time interval (short stop time) the dissipation of the kinetic energy of the motor merely by mechanical friction in the apparatus is inadequate because the kinetic energy of the motor is often too high. Additional, for example electromagnetically actuated, mechanical brakes are very intricate and susceptible to repair because they are subject to substantial wear. Regenerative braking, during which the mechanical kinetic energy of the motor is regenerated into electrical energy, requires that the regenerated electrical energy be fed back into the power source or be transformed into thermal energy via additional dissipation resistors. However, feedback into the power source is not possible or not permissible in many cases, and dissipation resistors additionally complicate the construction and circuit design.

Another braking method is to short-circuit the phase coils of the motor. The phase currents in conjunction with the exciting field then produce a braking torque. However, at high speeds the phase current tends to approximate to a limit value, thereby forming a natural current limitation. Also, as a result of the unfavourable geometrical relationship between current and magnetic field, which is dictated by the construction principle, only a small braking torque is obtained for high speeds (revolution numbers) of the motor. As the speed decreases the braking torque reaches a maximum and then as the speed decreases further it becomes zero. The amplitude and the variation of the braking torque as function of the speed are dictated by the dimensioning of the motor and its current supply elements, for example an inverter, and can be influenced only to a limited extent or not at all in the case of permanent excitation. The stop time of the motor which can thus be attained is inadequate for many uses.

From the afore-mentioned U.S. Pat. No. 5,220,257 it is known to brake the rotation of the motor by generating a torque in a direction opposite to that of the motor rotation. For this purpose a torque control signal is inverted with respect to a given reference level in the case of braking. However, this method does not enable optimum stop times to be attained.

SUMMARY OF THE INVENTION

It is an object of the invention to provide a circuit arrangement of the type defined in the opening paragraph which enables a minimal stop time to be achieved with a non-complicated construction.

According to the invention this object is achieved in that to decelerate the drive member the phase voltage(s) and/or load angles are controllable in such a manner that a substantially speed-independent electric power, in accordance with a maximum permissible phase current, is produced in the motor in a range of high speeds of movement of the drive member, which range is bounded towards lower speeds owing to a maximum permissible deceleration force being reached, the maximum permissible deceleration force occurs over the motor in a range of intermediate speeds, which adjoins the range of high speeds and of movement extends down to a speed at which a deceleration force that would be generated by direct short-circuiting of the phase coils would substantially reach a maximum, and the deceleration force decreases from its maximum permissible value to zero in a range of low speeds of movement between standstill and the range of intermediate speeds.

The deceleration force in the ranges of high and intermediate speeds can be set to values in the range between the values dictated by the above conditions and zero, and in the range of low speeds to values between the maximum permissible deceleration force and zero.

The invention recognises the fact that with the known arrangements and methods the maximum attainable or maximum permissible deceleration forces are not generated when additional dissipation elements are omitted, but that such forces can be obtained and utilised via comparatively simple physical relationships. The division into essentially three ranges of the speed of the drive member of the motor is based on the recognition that at higher speeds the parts of the drive system are loaded to a maximal extent by the phase currents. These currents should be limited so that neither demagnetisation of the motor nor damage to the current supply elements occurs. The maximum permissible phase current in the high-speed range is determined accordingly.

At a second limit speed the high-speed range is adjoined by an intermediate-speed range, in which an maximum permissible phase current occurs which can generate deceleration forces which may cause mechanical damage to the motor and the drive system. Moreover, this may affect the stability of the apparatus being braked. Therefore, the maximum permissible deceleration force is controlled in the intermediate-speed range.

The intermediate-speed range is adjoined by the low-speed range at a first limit speed. The first limit speed is advantageously selected as the speed at which a maximal deceleration force would be produced in the case of direct short-circuiting of the phase coils in the motor. However, the first limit speed may also assume a different value. In the low-speed range, which can be dimensioned by a suitable choice of the first limit speed depending on the specifications of the drive system to be realised, the deceleration force advantageously decreases to zero towards standstill. As a result of this, the motor stops without any strong force fluctuations, i.e. at least substantially without jerking, also in the immediate proximity of standstill. In addition, this also precludes a reversal of the motor in the deceleration mode.

The invention has the advantage that minimal stop times are attainable without any additional expensive parts. Only elements which are already available are used and, in particular, no additional (electronic) power devices or dissipation elements are required, the control circuit, which is present anyway, being utilised by the invention to control the current supply elements. In the deceleration mode in accordance with the invention the phase voltage(s) and/or the load angles are then adjusted by an appropriate drive of the current supply elements under control of the motion sensor.

The invention further simply enables the motor to be stopped, if required, in accordance with other functional relations between the deceleration force or the phase current and the speed. Consequently, the invention can be used not only for the purpose of reaching minimal stop times but also for universal purposes, i.e. it can be used in such a manner that a required maximum permissible stop time is reached with a minimal phase current, i.e. a minimal deceleration force, thereby enabling the load of the motor and the circuit arrangement for the commutation of the motor to be minimised.

In an advantageous embodiment of the invention the control circuit comprises:

a commutation stage which controls the current supply elements in accordance with given nominal-value signals for the amplitude(s) of the phase voltage(s) and for the load angle as well as a position signal representative of at least the instantaneous position of the drive member, a phase voltage determining stage which is arranged to receive the position signal and/or, if not included in the position signal, a motion signal representative of the speed of movement of the drive member, and which is adapted to derive therefrom and to supply the speed-dependent nominal-value signal of the amplitude(s) of the phase voltage(s) for the deceleration of the drive member, a load-angle determining stage which is arranged to receive the position signal and/or the motion signal, if not included in the position signal, and which is adapted to derive therefrom and to supply the speed-dependent nominal-value signal of the load angle for the deceleration of the drive member, a deceleration activating stage which is switchable by a mode control signal between a motoring mode and a deceleration mode and by means of which the phase voltage determining stage and the load-angle determining stage can be activated for the purpose of deceleration, and a nominal-value signal switching stage which is controllable by the deceleration activating stage and which is adapted to apply to the commutation stage given nominal-value signals corresponding to the nominal-value signals for the amplitude(s) of the phase voltage(s) and for the load angle from the phase voltage determining stage and the load-angle determining stage, respectively, in the deceleration mode or, if desired, in the motoring mode.

This embodiment of the invention has the advantage that the commutation of the motor is not influenced directly. Instead, nominal-value signals which are required depending on the desired mode of operation are generated for the amplitude(s) of the phase voltage(s) and for the load angle, in dependence upon the speed of the drive member of the motor. The speed can be derived simply by means of the motion sensor. Thus, in accordance with the invention it is merely required that a device for supplying the nominal-value signals for the deceleration mode be add to a control circuit already provided for motoring operation. Depending on the selected mode of operation, the control circuit can then utilise the nominal-value signals for motoring operation, or the nominal-value signals for deceleration for the commutation. The stages to be added to the control circuit in accordance with the invention can be combined with this circuit in a very simple and compact manner.

An advantageous variant of the invention is obtained in that the phase voltage determining stage determines the nominal-value signal for the phase voltage(s) U in accordance with the relationship $$U = \omega \cdot L \cdot Imax - \sqrt{\omega^2 \cdot \psi^2 - (R \cdot Imax)^2}$$

for the range of high speeds, in accordance with the relationship $$U = \omega \cdot L \cdot Imax \cdot \sqrt{\omega/\omega_0} - \sqrt{\omega^2 \cdot \psi^2 - (R \cdot Imax)^2} \cdot \omega/\omega_0$$

for the range of intermediate speeds, and in accordance with the relationship $$U = \omega^2 \cdot L \cdot \psi / R$$

for the range of low speeds; where:

$\omega$ is the electrical angular frequency of the motor,
L is the phase-coil inductance,
Imax is the maximum permissible phase current,
$\psi$ is the flux linkage between a phase coil and an excitation field of the motor,
R is the ohmic phase-coil resistance, and
$\omega_0$ is the electrical angular frequency $\omega$ of the motor at the boundary between the ranges of intermediate and high speeds of movement.

The maximum permissible phase current Imax then depends on, whichever is smaller, the maximum permissible currents through the current supply elements or the maximum permissible phase currents for which the motor will just not be demagnetised. Preferably, if possible, these values can be made to correspond by an appropriate dimensioning of the motor and the current supply elements.

The electrical angular frequency $\omega_0$ is reached at the second limit speed.

If in the above relationships for the phase voltage(s) U the parameters of the motor to be controlled in a special case are fixed, very simple functional relations are obtained between the electrical angular frequency $\omega$ of the motor, which is directly related to the speed of the motor, and the phase voltage or phase voltages U, which can be converted very simply in the phase-voltage determining stage. This enables a very simple construction of this phase-voltage determining stage to be obtained.

In another variant of the invention the phase voltage determining stage comprises a first storage device from which a value of the nominal-value signal for the phase voltage(s) can be read for each speed value derivable from the values of the position and/or motion signal which can be applied. The values of the nominal-value signals for the phase voltage(s) are then preferably derived from the above-mentioned relationships and are stored as a table by means of the first storage device. This results in the nominal-value signal being available very rapidly with a simple circuit arrangement.

In a further embodiment of the invention the phase-voltage determining stage including the first storage device can be constructed in such a manner that the entire range of speed values derivable from the values of the position and/or motion signal is divided into intervals, and a value of the nominal-value signal for the phase voltage(s), which value is common to all speed values of an interval, can be read from the first storage device for each interval. The phase voltage determining stage further comprises a first interpolation device for generating interpolated values of the nominal-value signal of the amplitude(s) of the phase voltage(s). This measure enables the size of the first storage device to be reduced significantly. In this case a single common value of the nominal-value signal for the phase voltage(s) is then assigned to all speed values within an interval. Likewise, one value of the nominal-value signal is assigned to all speed values of each of the other intervals. To read out the nominal-value signal for a given value of the speed an interpolation is effected between the associated common value of the nominal-value signal for the interval in which the actual value of the speed is situated and the values of the nominal-value signal corresponding to the adjacent intervals depending on the position of the actual value of the speed within its corresponding interval. In a variant of this method of determining the nominal-value signal it is also possible to assign a nominal-value signal value corresponding to the required relationship to given values of the speed. The position relative to the adjacent given values is determined for the actual value of the motor speed, upon which interpolation between the associated values of the nominal-value signal is effected in accordance with the position of the actual value of the speed.

Another embodiment of the invention is characterised in that the load-angle determining stage determines the nominal-value signal for the load angle $\delta$ in accordance with the relationship $$\delta = 180° - \arcsin \frac{R \cdot I\max}{\omega \cdot \psi}$$

for the range of high speeds, in accordance with the relationship $$\delta = 180° - \arcsin \frac{R \cdot I\max}{\sqrt{\omega \cdot \omega_0} \cdot \psi}$$

for the range of intermediate speeds, and in accordance with the relationship $$\delta = 90°$$

for the range of low speeds.

Thus, the nominal-value signal for the load angle $\delta$ can be determined simply from the same parameters and signals as the nominal-value signal for the phase voltage(s) U. Consequently, the construction of the load-angle determining stage can be just a simple as that of the phase-voltage determining stage.

It is advantageous if on the basis of given limit values for the position and/or motion signal the phase voltage determining stage and/or the load-angle determining stage determines from these signals in which of the ranges the actual value of the speed is situated. In this case the first and the second limit speed at the transitions between the low-speed range and the intermediate-speed range and between the intermediate-speed range and the high-speed range are used as limit values. Depending on the assignment of the actual value of the speed to one of these ranges a control parameter for the phase-voltage and/or the load-angle determining stage is available, which control parameter indicates in accordance with which of the possible relationships the nominal-value signals are to be derived from the speed. As a result of this, the range need not be determined if the phase-voltage determining stage includes the first storage device.

In a variant of the invention the load-angle determining stage comprises a second storage device from which a value of the nominal-value signal for the load angle can be read for each speed value derivable from the values of the position and/or motion signal which can be applied. Preferably, this is achieved in that the entire range of speed values derivable from the values of the position and/or motion signal is divided into intervals, a value of the nominal-value signal for the load angle, which value is common to all speed values of an interval, can be read from the first storage device for each interval, and the load-angle determining stage further comprises a second interpolation device for generating interpolated values of the nominal-value signal for the load angle.

What has been stated for the corresponding variants of the phase-voltage determining stage likewise applies to these variants of the load-angle determining stage. In particular, it is then no longer required to determine the range in which the actual value of the speed is situated by means of the load-angle determining stage.

In a further embodiment of the invention, in order to ensure that also during the start of the deceleration mode impermissible large phase currents and/or deceleration force are avoided, which are transient effects which may lead to damage to the motor or to the circuit arrangement by which the motor is commutated, during the change-over to the deceleration mode of the drive member the values of the nominal-value signals for the amplitude(s) of the phase voltage(s) and/or the load angle are changed, starting from their actual values in the mode prior to the change-over, into the given values for the deceleration mode at a rate not higher than a maximum permissible rate of change, the maximum permissible rate of change being dimensioned in such a manner that the phase current transients resulting from the change of the values of the nominal-value signals are limited to the maximum permissible phase current.

Thus, it is ensured that also when the deceleration mode is started, in the same way as when standstill is reached, particularly when this deceleration mode is started in a motoring mode with a high driving power, a change-over to the deceleration mode takes place without any dangerous jolting movements or current transients. In this way the mechanical and electrical parts are protected from damage.

In a preferred embodiment those values of the nominal-value signals which should not exceed given maximum values can then be changed in given steps in time. For this purpose the nominal values may be changed in a given rhythm by a fixed or variable difference which should not exceed a maximum permissible value, or the nominal-value signals may be subjected to a continuous change whose time derivative should not exceed a given value.

BRIEF DESCRIPTION OF THE DRAWINGS

An exemplary embodiment of the invention is shown in the drawings and will be described in more detail hereinafter. In the drawings:

In FIG. 1 motor 1 has a rotor which comprises permanent magnets 2 for field generation and a drive member 3. The motor stator has three phase coils 4, which are supplied with electric power from an inverter 6, which power is applied to the inverter 6 from a direct voltage source, not shown, via power supply terminals 7. The inverter 6 comprises a smoothing capacitor 8 and, for each of the phase coils 4, a series arrangement of two current supply elements 9. The smoothing capacitor 8 and all the series arrangements of current supply elements are connected in parallel with one another to the power supply terminals 7 and serve in a manner known per se for selectively connecting the phase coils 4 to the power supply terminals 7 and thereby supplying the motor 1 with energy. The motor 1 and the inverter 6 are shown very diagrammatically and can be implemented in a multitude of ways. For example, the number of phases may vary; the field generation may be effected by field windings instead of permanent magnets 2 and, moreover, a linearly moving drive member may be used instead of a rotary drive member 3. Besides, the inverter 6 may be implemented and modified in various manners, which are known per se and which will not be described in any detail.

Figure 1:
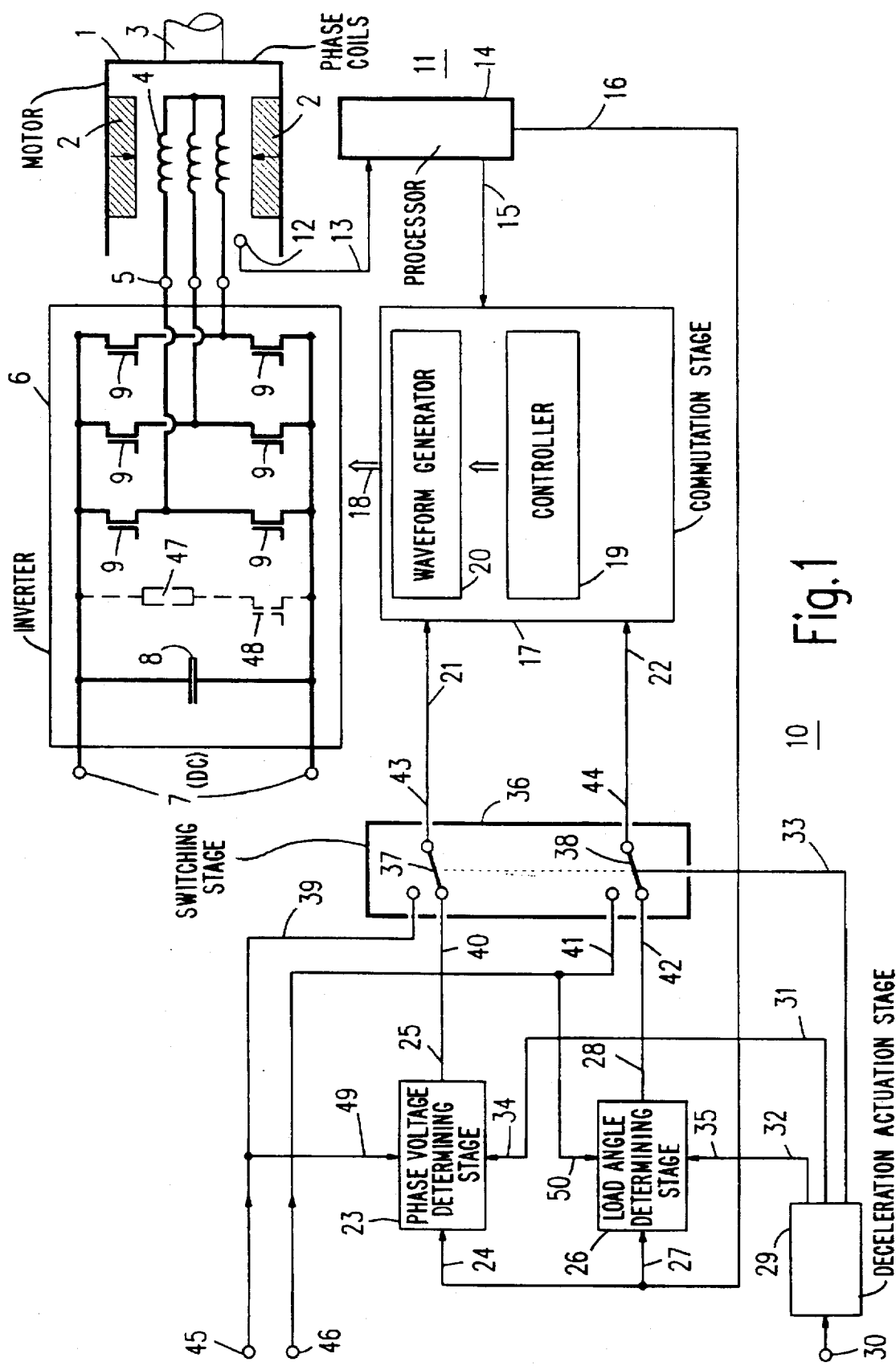
FIG. 1 shows diagrammatically a circuit arrangement in accordance with the invention.

The arrangement shown in FIG. 1 further comprises a control circuit 10 for controlling the current supply elements 9 and a device which is referred to hereinafter as a motion sensor 11 for determining the position and the speed of movement of the drive member 3. The motion sensor 11 includes a position detector 12, which may comprise a plurality of parts, for the detection of the instantaneous position of the drive member 3 of the motor 1. The position detector 12 supplies a position signal to a processing circuit 14 via a position-signal line 13, which processing circuit forms part of the motion sensor 11. In the processing circuit 14 the position signal applied via the position-signal line 13 is processed for further processing within the control circuit 10. This processing serves to generate a position signal suitable for the commutation of the motor 1 and also to derive a motion signal representative of the speed of the movable drive member 3 from the position signal applied by the position detector 12 via a position-signal line 13.

In the present embodiment the processed position signal is fed to a position signal output 15 and the motion signal to a motion-signal output 16 of the processing circuit 14. This separation between a position signal and a motion signal simplifies further processing and analysis of these signals. Alternatively, the position signal may provide information about the position as well as the speed of movement of the drive member 3. When such a position signal is to be processed the position information should generally be separated from the speed information.

The control circuit 10 comprises a commutation stage 17, which controls the current supply elements 9 in the inverter 6 via a control line 18. For this purpose the commutation stage 17 comprises, for example, as is shown very diagrammatically in FIG. 1, a controller 19 and a waveform generator 20 controlled by this controller 19. The commutation stage 17 has a nominal-value signal input 21 for the nominal-value signals for the amplitude(s) of the phase voltage(s) and a nominal-value signal input 22 for the load angle. Depending on nominal-value signals which will be described hereinafter and which are applied via these nominal-value signal inputs 21, 22 and depending on the position signal from the position signal output 15 of the processing circuit 14 the controller 19 controls the voltage waveform generator 20, which turns on or turns off the current supply elements 9 via the control line 18. All in all, the commutation stage 17 enables the motor 1 to be operated with given amplitudes of the phase voltages—which amplitudes are preferably the same for all the phase coils 4 in the case of a symmetrical construction of the motor 1 and may therefore also be referred to in singular as a phase voltage amplitude—and given load angles. However, the construction of the commutation stage 17 falls outside the scope of the present invention and will therefore not be described in further detail.

The control circuit 10 further comprises a phase voltage determining stage 23, having a motion signal 24 arranged to receive the motion signal from the motion-signal output 16 of the processing circuit 14. The speed-dependent nominal-value signal for the amplitudes of the phase voltages for the deceleration mode of the drive member 3 is produced by the phase voltage determining stage 23 at a nominal-value signal output 25 and can be applied to the first nominal-value signal input 21 of the commutation stage.

The control circuit 10 further comprises a load-angle determining stage 26 having a motion-signal input 27, via which the motion signal from the motion-signal output 16 of the processing circuit 14 can be applied, and a nominal-value signal output 28 for the nominal-value signal for the load angle, which nominal-value signal depends on the speed of the drive member and is to be supplied by the load-angle determining stage 26. This nominal-value signal can be applied from the nominal-value signal output 28 to the second nominal-value signal input 22 of the commutation stage 17.

The control circuit 10 also comprises a deceleration activating stage 29 having an input 30 arranged to receive a mode control signal by means of which this stage can be switched between a motoring mode and a deceleration mode. The deceleration activating stage 29 has two activating signal outputs 31, 32 and a switching signal output 33. When the deceleration activating stage 29 is changed over to the deceleration mode an activating signal is applied to the respective activating signal input 34 or 35 of the phase voltage determining stage 23 or the load-angle determining stage 26, respectively via the activating signal outputs 31, 32. The activating signals render the phase voltage determining stage 26 and the load-angle determining stage 26 for the deceleration mode operative, i.e. they activate these stages. The switching-signal output 33 supplies a switching signal to a nominal-value signal switching stage 36 which also forms part of the control circuit 10. The nominal-value signal switching stage 36 comprises two change-over switches 37 and 38, which each have two input terminals 39, 40 and 41, 42, respectively, and one output terminal 43 and 44, respectively. The second input terminal 40 of the first switch 37 is connected to the nominal-value signal output 25 of the phase voltage determining stage 23 and the output terminal 43 of the first switch 37 is connected to the first nominal-value signal input 21 of the commutation stage 17. Likewise, the nominal-value signal output 28 of the load-angle determining stage 26 is connected to the second input terminal 42 of the second switch 38 and the output terminal 44 of the second switch 38 is connected to the second nominal-value signal input 22 of the commutation stage 17. In the position of the switches 37, 38 as shown in FIG. 1 the nominal-value signals are thus applied from the phase voltage determining stage 23 and the load-angle determining stage 26 to the commutation stage 17, i.e. the switches 37, 38 are in their positions for the deceleration mode.

The first input terminal 39 of the first switch 37 is connected to a first terminal 45 and the first input terminal 41 of the second switch 38 is connected to a second terminal 46. By means of the terminals 45, 46 it is possible to apply external nominal-value signals for the phase voltage and the load angle, respectively, to the circuit arrangement in the motoring mode, thus enabling external control of the motor 1 in the motoring mode. Obviously, it also possible to apply nominal-value signals with constant values via the terminals 45, 46, if this is required for the motor drive.

Figure 2:
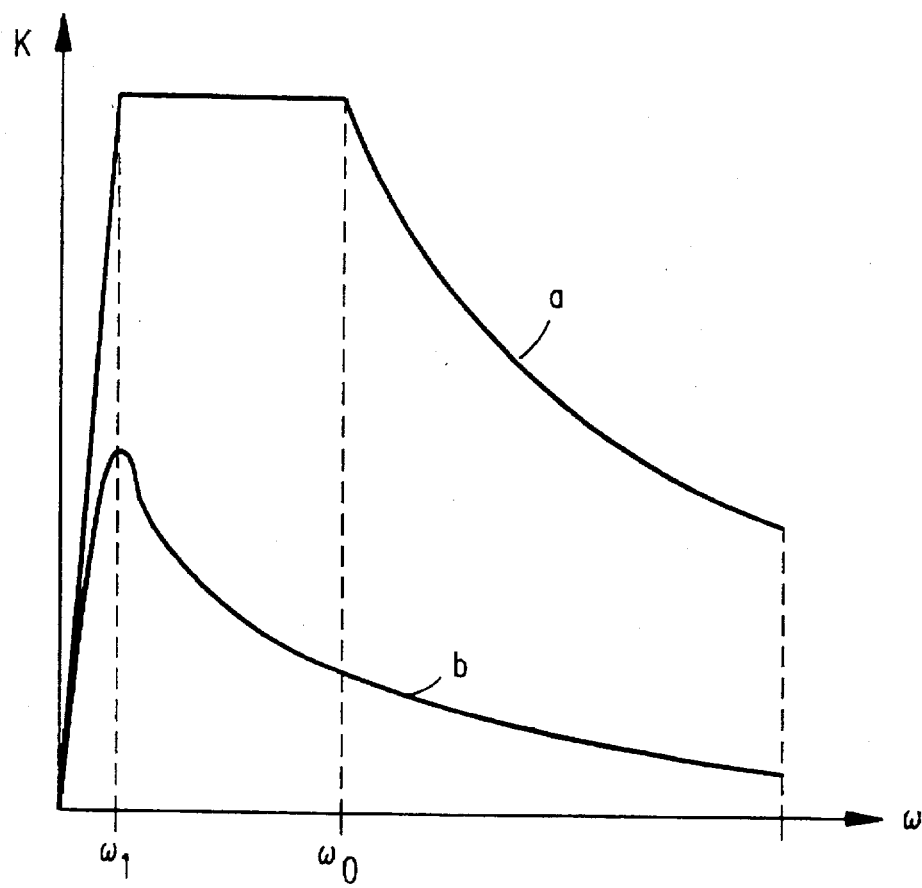
FIG. 2 is a diagram of the deceleration force plotted versus the speed of movement for the embodiment shown in FIG. 1.

FIG. 2 shows a diagram in which the deceleration force K is plotted versus the electrical angular frequency ω of the motor 1. In this diagram the letter a denotes the deceleration force K as a function of the electrical angular frequency ω for a deceleration process in accordance with the invention. It is to be noted that the electrical angular frequency ω is proportional to the speed of movement, i.e. in the present example proportional to the speed of the drive member 3. In the high-speed range, for values of the electrical angular frequency ω above the second limit speed $\omega_b$, the curve a is at least substantially a hyperbola which is determined by the maximum permissible electric power in the motor 1. In the intermediate-speed range between the first limit speed (corresponding to the associated value $\omega_1$ of the electrical angular frequency) and the second limit speed (corresponding to $\omega_b$) the deceleration force K is constant and corresponds to its maximum permissible value in these ranges. Below the first limit speed, i.e. between standstill and the value $\omega_1$, the deceleration force decreases towards standstill from its maximum permissible value to zero.

In comparison with this the curve b in FIG. 2 represents the deceleration force K as a function of the angular frequency ω in the case that the phase coils 4 of the motor 1 are simply short-circuited permanently for the purpose of deceleration. It can be seen that, as a result of this, only a substantially smaller deceleration force K can be obtained, which enables the motor 1 to be stopped only comparatively slowly.

Figure 3:
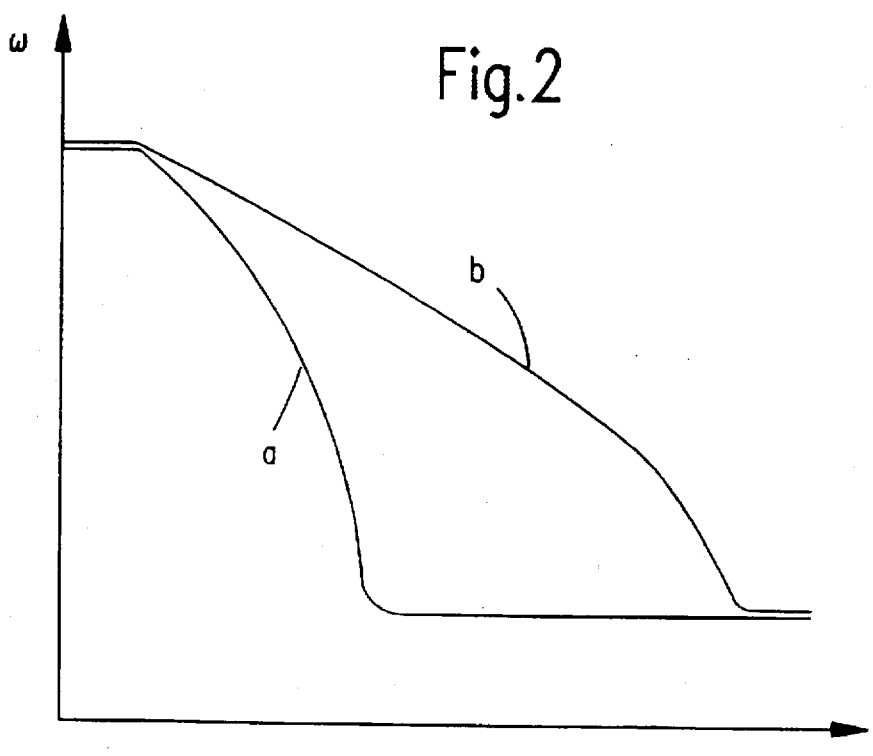
FIG. 3 shows a diagram of the speed as a function of time for an example of a deceleration process.

To illustrate the times needed to stop the motor 1 FIG. 3 shows an angular frequency versus time diagram a for a deceleration process in accordance with the invention, the curve b representing a deceleration process obtained with permanently short-circuited phase coils 4 of the motor 1. The letter t denotes the time. It can be seen that in the case of the invention the electrical angular frequency ω and, consequently, the revolution number of the drive member 3 of the motor 1, decreases substantially more rapidly to zero from the instant at which the deceleration mode is started than in the case b shown for comparison, in which the phase coils 4 are short-circuited. The decrease of the deceleration force K immediately before standstill is reached guarantees a comparatively gradual transition from the movement of the drive member 3 to standstill, i.e. a steady stop.

For the short-circuit of the phase coils 4 of the motor 1 as represented by the curves b in FIGS. 2 and 3 the arrangement shown in FIG. 1 comprises a braking resistor 47 with an electronic brake switch 48, as could be used in the inverter 6 for the regeneration or dissipation of the kinetic energy of the drive member 3 during deceleration. Apart from the fact that owing to the electrical and thermal energy to be handled by such a braking resistor 47 as well as a brake switch 48 these parts would require a substantial outlay, the deceleration force K which could then be obtained as a function of the angular frequency ω would be in accordance with the curve b in FIG. 2 in the most favourable case. However, as a result of this, deceleration would then proceed in accordance with the curve b in FIG. 3, i.e. in general it would require more time.

Thus, in accordance with the invention, substantially higher deceleration forces and hence substantially shorter stop times can be obtained. Moreover, the invention also enables the deceleration force K to be selected in the range below the curve a in FIG. 2 if this is in compliance with the drive specifications. The deceleration process can then be configured so as to minimise wear.

Conversely, in accordance with the invention, the deceleration force may also retain a maximal value in the low-speed range towards standstill. If stopping is then not configured for minimal jolting it is possible to aim at a short stop time. The variation of the deceleration force K as a function of the angular frequency ω in accordance with the curve a in FIG. 2 is based on the above relationships for the nominal-value signals of the phase voltage U and of the load angle δ for the three different ranges of low, intermediate and high speeds of movement.

In order to ensure a transition with minimal jolting between the motoring mode and the deceleration mode, as already described for the transition to standstill, the circuit arrangement 10 is configured in such a manner that when the deceleration mode is started by the deceleration activating stage 29, which is controlled by the mode control signal at the input 30, there is no abrupt change-over from the nominal-value signals for the phase voltage and the load angle at the terminals 45, 46 to those nominal-value signals—supplied by the phase voltage determining stage 23 and the load-angle determining stage—which are intended for controlling the actual value of the speed of movement in the deceleration mode. In fact, the nominal-value signal switching stage 36 is actuated via the switching-signal output 33 in such a manner that from the instant at which the deceleration mode is started all the subsequent nominal-value signals are applied from the phase voltage determining stage 23 and the load-angle determining stage 26 to the nominal-value signal inputs 21 and 22, respectively. The nominal-value signals for the amplitude of the phase voltage U and for the load angle are applied from the first terminal 45 and the second terminal 46, respectively, to the phase voltage determining stage 23 and the load-angle determining stage 26, respectively, via respective comparison inputs 49 and 50 of these stages. When the deceleration mode is started the phase voltage determining stage 23 and the load-angle determining stage 26 then compare the first speed-dependent value determined for the nominal-value signal for the deceleration mode with the last actual value of the corresponding nominal-value signal for the motoring mode active until then. The value of the nominal-value signal to be supplied at the nominal-value signal output 25 or 28 can now be changed over gradually in one or more time intervals or continuously from the motoring mode to the deceleration mode. This continuous or stepwise change-over is effected depending on whether the phase voltage determining stage 23 and the load-angle determining stage 26 are constructed as analog or as digital circuits.

In a simplified embodiment of the invention, in which smooth transitions from the motoring mode to the deceleration mode and from this deceleration mode to standstill are not essential, the activating signal inputs 34, 35 and the comparison inputs 49, 50 of the phase voltage determining stage 23 and the load-angle determining stage 26, respectively, may be dispensed with and, as a consequence, the deceleration activating stage 29 may be simplified considerably or may be dispensed with. The mode control signal can then be applied directly from the input 30 to the nominal-value signal switching stage 36.

Figure 4:
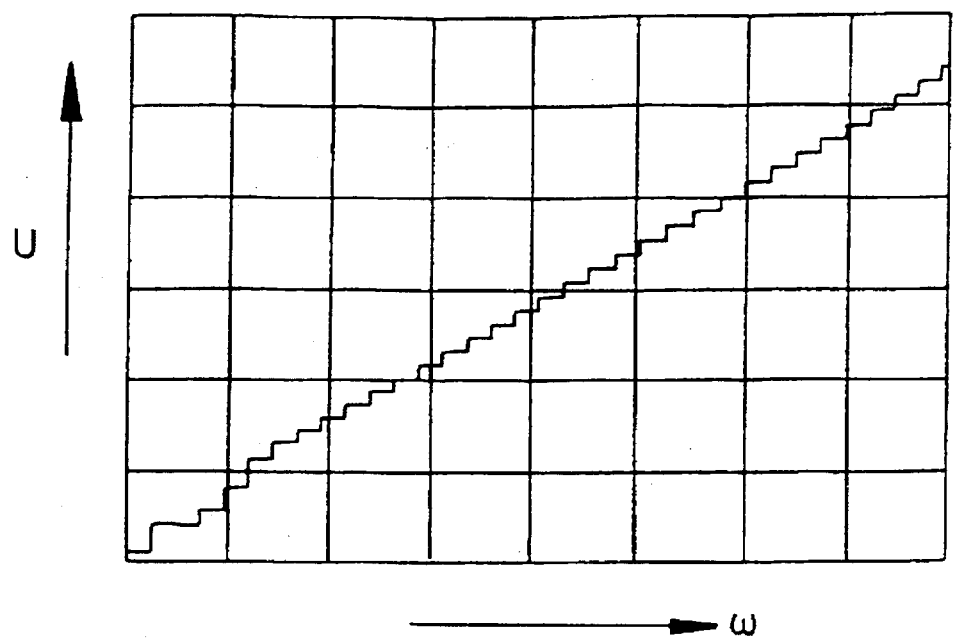
FIG. 4 shows an example of values of the nominal-value signal for the phase voltage(s) assigned to values of the speed.
Figure 5:
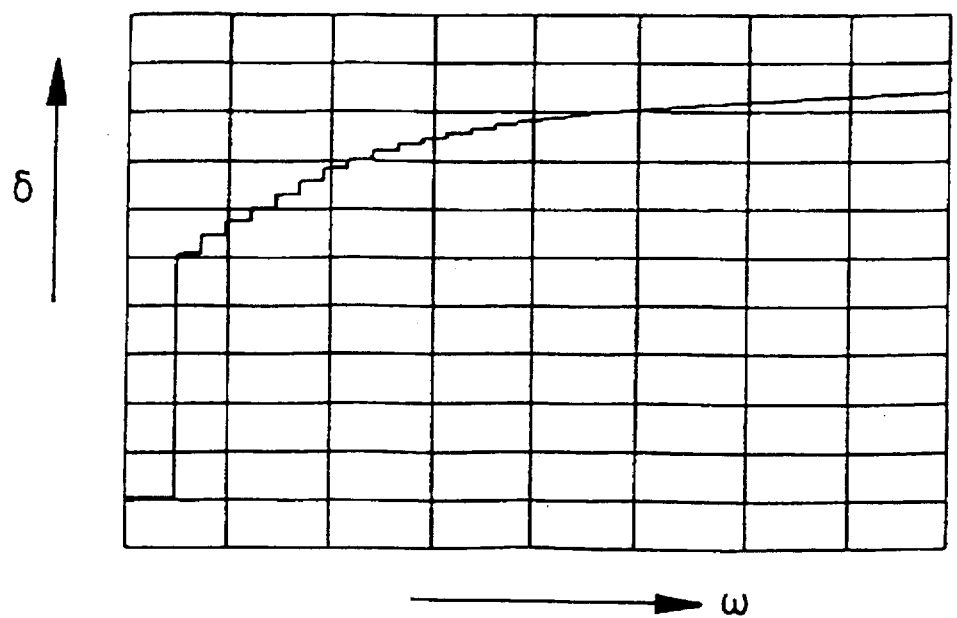
FIG. 5 shows an example of values of the nominal-value signal for the load angle assigned to values of the speed.

In the case that the phase voltage determining stage 23 and the load-angle determining stage 26 include a first and a second storage device, respectively, from which for each value of the speed derived from the received values of the motion signal a value of the nominal-value signal for the phase voltage U and the load angle δ can be read, FIGS. 4 and 5 show diagrammatically examples of the values stored in these storage devices for the nominal-value signals U and δ, respectively, in dependence upon the angular frequency ω of the motor 1. It can be seen that a given value of the respective nominal-value signal U or δ is assigned to each interval of the values of the speed of movement or corresponding to the angular frequency ω. Depending on the specifications of the drive system to be realised the steps in the curves of FIGS. 4 and 5, i.e. the intervals of the values of the speed of movement or the angular frequency ω can be larger or smaller. Particularly in the case of larger speed intervals an interpolation device may be provided in the phase voltage determining stage 23 and in the load-angle determining stage 26, which on the basis of the position of the actual value of the speed of movement within one of the intervals as shown in FIGS. 4 and 5 determines the value of the nominal-value signal to be supplied at the nominal-value signal output 25 or 28 from the stored values of the nominal-value signal of the associated interval and the adjacent interval or intervals by means of interpolation.

In order to achieve a smooth transition from the motoring mode to the deceleration mode the value of the nominal-value signal within a given time interval should only be changed over a given maximum number of steps of stored values of the nominal-value signals. Obviously, these steps and time intervals should be chosen in such a manner that this does not prevent large deceleration forces from being reached in accordance with the invention.

A particularly cheap and compact construction of the circuit arrangement in accordance with the invention can be achieved in that the phase voltage determining stage 23, the load-angle determining stage 26, the deceleration activating stage 29, the nominal-value signal switching stage 36 and, preferably, also the commutation stage 17 as well as the processing circuit 14 are combined in a microprocessor controlled circuit arrangement. The additional number of parts for the control circuit 10 in accordance with the invention then becomes particularly small.

We claim:

1. A circuit arrangement for controlling the operating speed and deceleration time of an electronically commutated motor having a rotary drive member and a stator having at least one phase coil, said circuit arrangement comprising: current supply elements for supplying current to the phase coils from a direct voltage source; motion sensing means for producing a drive status signal indicative of at least one of the position and speed of movement of said drive member; and a control circuit for controlling the current supply elements on the basis of said drive status signal so as to obtain given phase voltages and a given load angle during motor operation; the control circuit being responsive to said drive status signal and to a supplied mode control signal to control at least one of the motor phase voltages and load angle so as to produce a deceleration force on the drive member which changes in accordance with the following speed ranges thereof;

(i) a high speed range over which a maximum permissible current is produced in the phase coils and the deceleration force increases to a maximum value as speed of the drive member is reduced to a first lower speed limit;

(ii) an intermediate speed range which adjoins the high speed range at said first lower speed limit and over which the deceleration force remains substantially constant at said maximum value as speed is further reduced to a second lower speed limit; and (iii) a low speed range which adjoins the intermediate speed range at said second lower speed limit and over which the deceleration force reduces as speed is further reduced to a stop, the second lower speed limit being a speed at which a deceleration force obtained upon direct short-circuiting of the phase coils would reach its maximum value.

2. A circuit arrangement as claimed in claim 1 wherein said control circuit comprises:

a commutation stage for controlling the current supply elements in accordance with said drive status signal and further in accordance with nominal-value signals supplied thereto signifying the amplitudes of the phase voltages and load angle;

a phase voltage determining stage for receiving said drive status signal and adapted to derive therefrom and provide to said commutation stage a speed-dependent nominal-value signal signifying amplitudes of phase voltages for producing deceleration of said drive member;

a load angle determining stage for also receiving said drive status signal and adapted to derive therefrom and provide to said commutation stage a speed-dependent nominal-value signal signifying load angle for producing deceleration of said drive member;

a deceleration activation stage which is switchable by said mode control signal between a motoring mode and a deceleration mode, and is adapted to actuate the phase voltage determining stage and the load angle determining stage so as to produce deceleration of said drive member; and a switching stage controlled by the deceleration activation stage to supply the commutation stage with nominal-value signals for either of said motoring mode and said deceleration mode, depending on which is signified by said mode control signal, the nominal-value signals for the deceleration mode being those derived by said phase-voltage determining stage and said load angle determining stage.

3. A circuit arrangement as claimed in claim 2, characterized in that change-over of the motor from the motoring mode to the deceleration mode is effected by said control circuit by changing the nominal-value signals for at least one of the load angle and the phase voltages so as to produce deceleration at a rate not exceeding a predetermined maximum permissible rate of change, said maximum permissible rate of change being such that current transients in the phase coils resulting from the changes in said nominal-value signals do not exceed a predetermined maximum permissible current in said coils.

4. A circuit arrangement as claimed in claim 2, characterised in that the phase voltage determining stage determines the nominal-value signal for the phase voltage(s) U in accordance with the relationship $$U = \omega \cdot L \cdot Imax - \sqrt{\omega^2 \cdot \psi^2 - (R \cdot Imax)^2}$$

for the range of high speeds, in accordance with the relationship $$U = \omega \cdot L \cdot Imax \cdot \sqrt{\omega/\omega_0} - \sqrt{\omega^2 \cdot \psi^2 - (R \cdot Imax)^2 \cdot \omega/\omega_0}$$

for the range of intermediate speeds, and in accordance with the relationship $$U = \omega^2 \cdot L \cdot \psi / R$$

for the range of low speeds, where
ω is the electrical angular frequency of the motor,
L is the phase-coil inductance,
Imax is the maximum permissible phase current,
ψ is the flux linkage between a phase coil and an excitation field of the motor,
R is the ohmic phase-coil resistance, and
$\omega_0$ is the electrical angular frequency ω of the motor at the boundary between the ranges of intermediate and high speeds of movement.

5. A circuit arrangement as claimed in claim 2, characterised in that the phase voltage determining stage comprises a first storage device from which a value of the nominal-value signal for the phase voltage(s) can be read for each speed value derivable from the values of the position and/or motion signal which can be applied.

6. A circuit arrangement as claimed in claim 5, characterised in that the entire range of speed values derivable from the values of the position and/or motion signal is divided into intervals, a value of the nominal-value signal for the phase voltage(s), which value is common to all speed values of an interval, can be read from the first storage device for each interval, and the phase voltage determining stage further comprises a first interpolation device for generating interpolated values of the nominal-value signal of the amplitude(s) of the phase voltage(s).

7. A circuit arrangement as claimed in claim 2, characterised in that the load-angle determining stage determines the nominal-value signal for the load angle δ in accordance with the relationship $$\delta = 180° - \arcsin \frac{R \cdot Imax}{\omega \cdot \psi}$$

for the range of high speeds, in accordance with the relationship $$\delta = 180° - \arcsin \frac{R \cdot Imax}{\sqrt{\omega \cdot \omega_0} \cdot \psi}$$

for the range of intermediate speeds, and in accordance with the relationship $$\delta = 90°$$

for the range of low speeds.

8. A circuit arrangement as claimed in claim 2, characterised in that on the basis of given limit values for the position and/or motion signal the phase voltage determining stage and/or the load-angle determining stage determines from these signals in which of the ranges the actual value of the speed is situated.

9. A circuit arrangement as claimed in claim 2, characterised in that the load-angle determining stage comprises a second storage device from which a value of the nominal-value signal for the load angle can be read for each speed value derivable from the values of the position and/or motion signal which can be applied.

10. A circuit arrangement as claimed in claim 9, characterised in that the entire range of speed values derivable from the values of the position and/or motion signal is divided into intervals, a value of the nominal-value signal for the load angle, which value is common to all speed values of an interval, can be read from the first storage device for each interval, and the load-angle determining stage further comprises a second interpolation device for generating interpolated values of the nominal-value signal for the load angle.

* * * * *